(12) United States Patent
Du et al.

(10) Patent No.: US 7,514,385 B2
(45) Date of Patent: *Apr. 7, 2009

(54) RARE EARTH Y-ZEOLITE CATALYST FOR CRACKING HYDROCARBONS AND A METHOD FOR PREPARING SAME

(75) Inventors: Jun Du, Beijing (CN); Zheng Li, Beijing (CN); Zhijian Da, Beijing (CN); Mingyuan He, Beijing (CN)

(73) Assignee: China Petroleum and Chemical Corporation and Research Institute of Petroleum Processing, Sinopec, Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 10/533,488

(22) PCT Filed: Oct. 28, 2003

(86) PCT No.: PCT/CN03/00910

§ 371 (c)(1),
(2), (4) Date: Mar. 22, 2006

(87) PCT Pub. No.: WO2004/037413

PCT Pub. Date: May 6, 2004

(65) Prior Publication Data

US 2006/0199725 A1    Sep. 7, 2006

(30) Foreign Application Priority Data

Oct. 28, 2002    (CN)    ................................ 02 1 46614

(51) Int. Cl.
*B01J 29/06*    (2006.01)
(52) U.S. Cl. .......................................... 502/73; 502/79
(58) Field of Classification Search .................... 502/73, 502/79

See application file for complete search history.

(56) References Cited

U.S. PATENT DOCUMENTS

| | | | |
|---|---|---|---|
| 4,632,749 A | 12/1986 | Hilfman | |
| 5,013,700 A | 5/1991 | Falth | |
| 5,023,066 A | 6/1991 | Gimpel et al. | |
| 5,535,817 A * | 7/1996 | Dunne | ................... 165/104.12 |
| 5,705,142 A | 1/1998 | Tan-no et al. | |
| 6,787,123 B2 * | 9/2004 | Du et al. | ..................... 423/713 |
| 2003/0064881 A1 * | 4/2003 | Du et al. | ....................... 502/65 |

FOREIGN PATENT DOCUMENTS

| | | |
|---|---|---|
| CN | 1127161 | 7/1996 |
| CN | 1057977 | 11/2000 |
| CN | 1325940 | 12/2001 |
| CN | 1354223 | 6/2002 |
| CN | 1382525 | 12/2002 |
| CN | 1382631 | 12/2002 |
| JP | 4-59616 | 2/1992 |

* cited by examiner

*Primary Examiner*—Elizabeth D Wood
(74) *Attorney, Agent, or Firm*—Weaver Austin Villeneuve & Sampson LLP

(57) ABSTRACT

The invention discloses a rare-earth Y-zeolite-containing catalyst for cracking hydrocarbons and a method for preparing the same. The catalyst is characterized in that the rare-earth content in crystal lattice of the rare-earth Y-zeolite, calculated in $RE_2O_3$, is from 4 to 15% by weight, the original unit cell size is from 2.440 nm to 2.465 nm and the equilibrium unit cell size after 100% steam-aging treatment at 800° C. for 17 hours is larger than 2.435 nm. The catalyst is obtained in the following steps: the rare-earth Y-zeolite is dried first till its water content less than 10% by weight, then in a weight ratio of $SiCl_4$:Y-zeolite=0.1~0.9:1, reacts with $SiCl_4$ gas carried by dry air, further is purged by dry air and washed by decationized water to remove the soluble by-products; the resulted rare-earth Y-zeolite is mixed with a binder and a clay, pulped and formed by spary drying. The zeolite content of the catalyst disclosed in present invention decreases 5~25% by weight compared to the catalyst prepared in prior art for cracking heavy oil and decreasing olefin content. The catalyst is characterized with good cracking activity, high hydrothermal stability, and high conversion of heavy oil as well as excellent selectivity of gasoline, dry gas and coke; moreover, the olefin content in the produced gasoline decreases effectively.

33 Claims, 2 Drawing Sheets

RARE EARTH Y-ZEOLITE CATALYST FOR CRACKING HYDROCARBONS AND A METHOD FOR PREPARING SAME

TECHNICAL FIELD

The present invention relates to a catalyst for cracking hydrocarbons and a method for preparing the same. More particularly, the present invention relates to a rare-earth Y-zeolite-containing catalyst for cracking hydrocarbons and a method for preparing the same.

TECHNICAL BACKGROUND

Recently, the requirement for the quality of hydrocarbon products has become more and more critical with the growing tendency for raw oil to become heavier and the increase of the consideration for environmental protection. In 1980's, the progress for preparing lead-free gasoline promoted the development of the catalytic cracking process and the catalysts. The Y-zeolite with high silica content as well as various catalysts and auxiliaries with high octane number were produced and used in the conversion of cheap heavy oil to the light products with high additional values.

The processing of inferior residuum has been long concerned with in petroleum refining industry. It is an important problem need to be resolved urgently that how to obtain fuel with high yield of light oil, less olefin and sulfur, as well as being environmentally friendly, when treating the inferior residuum and blending more residuum to the feedstock oil.

In U.S. Pat. No. 3,293,192 and Society of Chemical Engineering (London) Monograph Molecular Sieves, P. 186 (1968), C. V. M C. Daniel and P. K. Maher reported a hydrothermal dealumination method used to prepare Y-zeolite with high silica content, since then the method has been widely used. U.S. Pat. No. 3,442,715 disclosed a dealuminated Y-zeolite (DAY), U.S. Pat. No. 3,449,070 disclosed an ultra-stable Y-zeolite (USY), U.S. Pat. No. 4,51,694 and U.S. Pat. No. 4,401,556 disclosed an ultra-stable hydrophobic Y-zeolite, etc. The ultra-stable Y-zeolite (USY) was widely used and developed because it has high Si/Al ratio, high hydrothermal stability, low hydrogen transfer activity and good selectivity of coke and can be used to prepare catalyst with high octane number when treating heavy oil.

With the increasing development of heavy oil processing, the characters of ultra-stable Y-zeolite with high silica content, such as high Si/Al ratio, high hydrothermal stability and low hydrogen transfer activity, are no more suitable for the worse of the inferior heavy oil and cannot satisfy the environmental requirement on catalytic cracking cleaning fuel. It's urgent to find out a kind of zeolite, which has high hydrothermal stability, high cracking activity, good hydrogen transfer activity, stability and selectivity of coke, and the ability to decrease the olefin and sulfur content of gasoline effectively while increasing the conversion of heavy oil.

In order to increase the activity of Y-zeolite with high silica content, U.S. Pat. No. 4,840,724 discloses a method to increase the rare-earth content of ultra-stable Y-zeolite by rare-earth ion exchange. The process used to prepare Y-zeolite with high silica content (USY) through hydrothermal method has many hydrothermal exchange and high-temperature calcination procedures. In the process of dealumination with supplements of silica, a lot of dealuminated holes are formed and cannot be filled in time with the silica migrating from the skeleton, which usually leads to the collapse of the crystal lattice of the zeolite. The resulted silica and alumina fragments tend to block the channels of the zeolite and are not easily eliminated, which results in the low ion exchange level of the rare-earth. In the rare-earth ultra-stable Y-zeolite (RE-USY), the highest $RE_2O_3$ content, used to express the rare-earth content, is only about 3% by weight after many times of ion exchange and calcinations. Such a low $RE_2O_3$ content is far from satisfying the requirement of high cracking activity and stable hydrogen transfer activity for the catalyst in the deep treating of inferior raw oil.

In order to increase the activity of Y-zeolite and utilize the high ion exchange capacity of NaY zeolite, REHY and REY zeolites with high rare-earth content through are prepared many times of rare-earth ion exchange and high-temperature calcination procedures to increase the rare-earth content of the zeolite. The $RE_2O_3$ content of REHY zeolite was increased to about 6~16% by weight and the $RE_2O_3$ content of REY zeolite was increased to about 8~20% by weight, which may satisfy the requirement of increasing the hydrogen transfer activity of the zeolite and thereby achieve the object of increasing cracking activity, But the use of hydrothermal method with many times of ion ex-change between ammonium ion and rare-earth ion and high-temperature calcination usually leads to the collapse of the crystal lattice of REY and REHY zeolite. The resulted silica and alumina fragments tend to block the channels of the zeolite and are not easily eliminated, which in turn inhibit the effective migration of rare-earth ion ($RE^{3+}$) to β-cage of the zeolite, REHY and REY zeolites have a fatal defect in that the original crystal cell is hard to shrink, the Si/Al ratio is low, the unit cell size is of 2.470 nm and the zeolite skeleton structure is not stable. As a result, the prepared catalyst shows high original cracking activity and hydrogen transfer activity, is easy to be deactivated in reaction equipments, and the hydrothermal stability, the equilibrium activity as well as the equilibrium unit cell size of Y-zeolite used as active component are low. During manufacture process, a large amount of fresh catalyst need to be added to keep activity because of the rapid decrease of the activity, the lost of the original hydrogen transfer activity and the decrease of the coke selectivity of the catalyst. In the manufacture of hydrocarbons the low stability of cracking activity and hydrogen transfer activity of the catalyst results in a high consumption of the catalyst, a high product yield of coke and an unstable operation of the equipment. So they cannot be widely used in the deep treating of inferior raw oil and fulfil the purpose of manufacturing environmentally friendly fuel and decreasing the olefin content of gasoline.

DISCLOSURE OF THE INVENTION

The object of the invention is to supply a rare-earth Y-zeolite-containing catalyst for cracking hydrocarbons and a method for preparing the same in order to overcome the above shortcomings in prior art, said catalyst is suitable for treating inferior raw oil, manufacturing environmentally friendly fuel and decreasing the olefin content of gasoline.

The rare-earth Y-zeolite-containing catalyst for cracking hydrocarbons supplied by present invention is characterized in that the rare-earth content in crystal lattice of the rare-earth Y-zeolite, calculated in $RE_2O_3$, is from 4 to 15% by weight, preferred from 6 to 12% by weight. The original unit cell size is from 2.440 nm to 2.465 nm, preferred from 2.445 nm to 2.460 nm, more preferred from 2.450 nm to 2.458 nm. The equilibrium unit cell size after 100% steam-aging treatment at 800° C. for 17 hours is larger than 2.435 nm, preferred than 2.440 nm, more preferred than 2.445 nm.

The content of the rare-earth Y-zeolite in the catalyst of present invention is from 10 to 50% by weight, preferred from 15 to 40% by weight, more preferred from 15 to 35% by weight.

The rare-earth Y-zeolite in the catalyst of present invention has a relatively high Si/Al ratio in the skeleton, and the Si/Al ratio is from 6 to 20, preferred from 8 to 15, more preferred from 8.3 to 8.8. The content of $Na_2O$ is less than 1.0% by weight, preferred less than 0.5% by weight.

The rare-earth Y-zeolite in the catalyst of present invention has unblocked channels, in which the rare-earth ions ($RE^{3+}$) can migrate from super-cage to β-cage effectively. Many more rare-earth ions ($RE^{3+}$) enter β-cage of the zeolite and increase the stability of the crystal lattice. A large amount of rare-earth in β-cage could still be kept after strict steam-aging treatment and form stable hydroxyl structures, It is confirmed that the equilibrium unit cell size after 100% steam-aging at 800° C. for 17 hours still keeps larger than 2.435 nm, even larger than 2.440 nm. Because of the difference of the original unit cell size, the zeolite has obvious structural stability with the equilibrium unit cell size changes from 2.435 nm to 2.455 nm. Due to the stability of the structure, the differential thermal collapse temperature of the zeolite is higher than 1000° C., preferred from 1000 to 1056° C.

The spectra of the hydroxyl structure characterized by FT-IR indicate that the typical peak 3540 $cm^{-1}$ for hydroxyl structure of β-cage is clearly stronger than that of REY zeolite and REHY zeolite. The aridity spectra of B-acid characterized by FT-IR indicate that the acidity of B-acid and the stability of the acidity are far higher than those of REHY and REY zeolite. For instance, seen from FIG. 1, the hydroxyl structural peak of β-cage near 3540 $cm^{-1}$ for the rare-earth Y-zeolite (RHSY) with 10% by weight of $RE_2O_3$ used in the catalyst of present invention is obviously stronger than that of REY zeolite with 16.6% by weight of $RE_2O_3$, and much more stronger than that of REHY zeolite with 13.6% by weight of $RE_2O_3$. Seen from FIG. 2 the acidity of B-acid for RHSY zeolite is far higher than that of REHY and REY zeolite.

The rare-earth Y-zeolite in the catalyst of present invention overcomes the shortcoming of REUSY zeolite with low rare-earth ion exchange degree and the shortcomings of REY and REHY zeolite with large original unit cell size, low differential thermal collapse temperature, and high $Na_2O$ content as well as poor hydrothermal stability. The present rare-earth Y-zeolite not only has small original unit cell size, high Si/Al ratio and good hydrothermal stability just like REUSY zeolite, but also has high rare-earth content, excellent hydrogen transfer activity just like REY and REHY zeolite. At the same time it also overcomes the shortcoming of REY, REHY and REUSY with low equilibrium unit cell size and poor structural stability.

The catalyst disclosed in present invention may contain zeolite with MFI structure as cracking active component. The zeolite with MFI structure is selected from ZSM-5 or one or more of the zeolites with MFI structure, such as the five-ring rare-earth zeolite with high silica content (designated as ZRP) disclosed in CN1052290A, CN1058382A, CN1147420A and CN1194181A. This zeolite is prepared by using REY or REHY zeolite with rare-earth content of 2~23% by weight (calculated in oxide) and Na content less than 5.0% by weight as crystal seeds. The weight ratio of the zeolite with MFI structure and the rare-earth Y-zeolite is from 0.01 to 0.5.

The present invention also provides a method for preparing the rare-earth Y-zeolite-containing catalyst for cracking hydrocarbons, comprising the following steps:

(1) The rare-earth Y-zeolite is dried till its water content less than 10% by weight, then in a weight ratio of $SiCl_4$:Y-zeolite=0.1~0.9:1, reacts with $SiCl_4$ gas carried by dry air at 150~600° C. for 10 min to 6 hours, further is purged by dry air for 5 min to 2 hours and washed by decationized water to remove the residual soluble by-products in the zeolite, in which the soluble by-products are $Na^+$, $Cl^-$, $Al^{3+}$ and $Si^{4+}$ etc., and most of them are $Na^+$, $Cl^-$, $Al^{3+}$;

(2) A feedstock comprising of 10-50% by weight, preferred 15~40% by weight of the rare-earth Y-zeolite obtained in step (1), 10~60% by weight, preferred 15~40% by weight of a binder, and 2~75% by weight, preferred 20~60% by weight of a clay is mixed and pulped, and formed by spray drying.

In the method provided by present invention, the preparing process of the rare-earth Y-zeolite disclosed in step (1) has been described in the application of CN01115612.0 by the inventor. Based on the gas phase chemical method of $SiCl_4$ and the fasile diffusibility of the substance in gaseous state. $SiCl_4$ with dynamics radius of 0.687 nm was introduced in gaseous state into the channels of the zeolite in this preparing process. In effective combination with the high ion exchange capacity of NaY zeolite, the isomorphous replacement reaction was carried out with the dealumination and the supplement of silica.

The rare-earth Y-zeolite disclosed in step (1) may be the REY and REHY zeolite widely used in industry, and also the product of the NaY zeolite exchanged rare-earth ion.

In general, the rare-earth content of REHY zeolite, calculated in $RE_2O_3$, is from 6 to 16% by weight and the $NA_2O$ content is more than 4% by weight. The rare-earth content of REY zeolite, calculated in $RE_2O_3$, is from 10 to 18% by weight and the $Na_2O$ content is more than 2% by weight. The rare-earth ion exchange process of NaY zeolite is carried out by exchanging the NaY zeolite with Si/Al ratio higher than 3.5 and the rare-earth chloride solution in a weight ratio of NaY:$RECl_3$:$H_2O$=1:0.1~0.25:5~15 at 80~90° C. for 30 to 60 min under a pH more than 3.5, and then with or without drying.

In the method of present invention, the REHY and REY raw materials or the NaY zeolite ion exchanged with the rare-earth chloride solution used to prepare the rare-earth Y-zeolite disclosed in step (1) have to be dried prior to the reaction so that their water contents are less than 10% by weight, preferred less than 5% by weight.

In the method of present invention, the binder disclosed in step (2) is selected from one or more of pseudoboehmite, alumina sol, silica sol and phosphorus-alumina sol, preferred the double-alumina binder, in which the weight ratio of pseudoboehmite and alumina sol is 10~40:0~30, preferred 15~25:2~25. When the double-alumina binder is used, the weight ratio of acid and alimina in the acid treatment of pseudoboehmite is 0.1~0.6:1, preferred 0.15~0.35:1. Generally the acid treatment is proceeded at 40-90° C. for 0.5 to 6 hours by adding hydrochloric acid. The pseudoboehmite after acid treatment can be used with alumina sol or phosphorus-alumina sol.

In the method of present invention, the clay is the clay usually used in cracking catalyst matrix, such as Kaolin, halloysite, montmorillonite, bentonite or sepiolite, etc, In the method of present invention, the catalyst is obtained by pulping the feedstock comprising of a zeolite, a clay and a binder in conventional method, homogenizing, spray-drying with inlet temperature of 550~600° C. and outlet temperature of 250~300° C.

The catalyst provided in present invention can be used to treat all kinds of raw oil, especially the inferior raw oil, such as all kinds of residuum (heavy oil). The residuum mainly includes full atmospheric residuum, distilled oil blended with atmospheric residuum and distilled oil blended with vacuumed residuum.

The catalyst provided in present invention, comparing to the catalyst using REUSY, REHY, REY and P-REHY as cracking active component in the prior art, is characterized with good cracking activity, high hydrothermal stability, and high conversion of heavy oil as well as excellent selectivity of gasoline, dry gas and coke. The olefin content in the produced gasoline decreases effectively due to the high hydrogen transfer activity. The zeolite content of the catalyst decreases 5~25% compared to the catalyst prepared in prior art for cracking the heavy oil and decreasing the olefin content.

EMBODIMENTS

Figure 1:
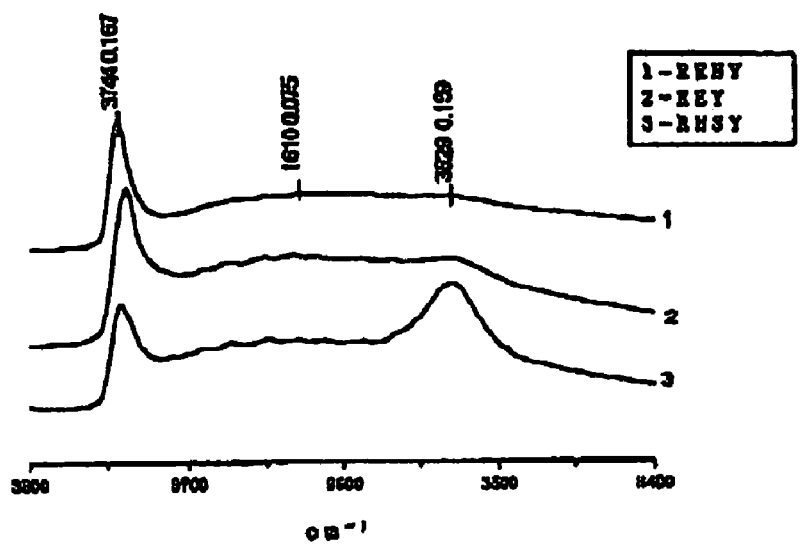
FIG. 1 is the FT-IR spectra of the hydroxyl structure of the zeolite used in the catalyst after 100% steam-aging treatment at 800° C. for 17 hours.

The following examples are used to illustrate the present invention.

In the examples and comparative examples the hydroxyl structural spectra and the acidity graph of the samples were characterized by FT-IR.

In the examples, the $RE_2O_3$ and $Al_2O_3$ contents of the samples were measured by fluorometry. The specific surface area and pore volume were measured by low temperature nitrogen adsorption-desorption method.

The micro activity test on light oil is proceeded at 460° C. by using Dagang light diesel with a distillation range of 235~335° C. as feedstock, and the catalyst-oil ratio of 3.2 and the weight hourly space velocity (WHSV) of 16 $h^{-1}$.

The micro activity test on heavy oil is proceeded at 482° C. with a catalyst-oil ratio of 4.

Example 1~7 are used to illustrate the preparing procedure and physical-chemical parameters of the rare-earth Y-zeolite in the catalyst disclosed in present invention.

EXAMPLE 1

NaY zeolite with a dry basis of 85% (a Si/Al ratio of 4.0, a unit cell size of 2.473 nm, a $Al_2O_3$ content of 24.8%, a $Na_2O$ content of 16%, produced by Zhoucun Catalyst Factory, Qilu Petrochemical Company) was ion exchanged with a rare-earth solution in a ratio of $NaY:RECl_3:H_2O=1:0.21:10$ at 80~90° C. for 60 min, and dried till the water content was less than 10% and the $RE_2O_3$ content was 16%, in which $La_2O_3$ content was 4.16%, $Ce_2O_3$ content was 8.16%, and the content of other rare-earth oxides was 3.68%. In a ratio of $NaY:SiCl_4=1:0.4$, the ion exchanged NaY zeolite reacted with $SiCl_4$ gas carried by dry air at 550° C. for 120 min, and purged with dry air for 20 min, and then washed and filtrated to remove $Cl^-$ and $Na^+$, and obtained a sample, designated as RHSY-1. The physical-chemical parameters arc listed in table 1.

EXAMPLE 2

NaY zeolite with a dry basis of 75% (a Si/Al ratio of 5.05, a unit cell size of 2.466 nm, a $Al_2O_3$ content of 21.2%, a $Na_2O$ content of 15.8%, produced by Zhoucun Catalyst Factory, Qilu Petrochemical Company) was ion exchanged with a rare-earth solution in a ratio of $NaY:RECl_3:H_2O=1:0.25:10$ at 80~95° C. for 40 min, and then was filtrated, washed, dried and dehydrated. In a ratio of $NaY:SiCl_4=1:0.25$, the ion exchanged NaY zeolite reacted with $SiCl_4$ gas carried by dry air at 450° C. for 60 min and purged with dry air for 120 min. and then washed and filtrated to obtain a sample, designated as RHSY-2. The physical-chemical parameters are listed in table 1.

EXAMPLE 3

REHY zeolite (a $RE_2O_3$ content of 13.4%, in which a $La_2O_3$ content of 10.7%, a $Ce_2O_3$ content of 2.1%, a content of other rare-earth oxides of 0.6%, a unit cell size of 2.469 nm, a differential thermal collapse temperature of 985° C., a $Na_2O$ content of 4.4%, produced by Zhoucun Catalyst Factory, Qilu Petrochemical Company) was put into a reactor to be dried till the water content less than 5%. Then in a ratio of $REHY:SiCl_4=1:0.75$, the dried REHY zeolite reacted with $SiCl_4$ gas carried by dry air at 350° C. for 3 hours and purged with dry air for 60 min. and then washed and filtrated to obtain a sample, designated as RHSY-3. The physical-chemical parameters are listed in table 1.

EXAMPLE 4

Figure 2:
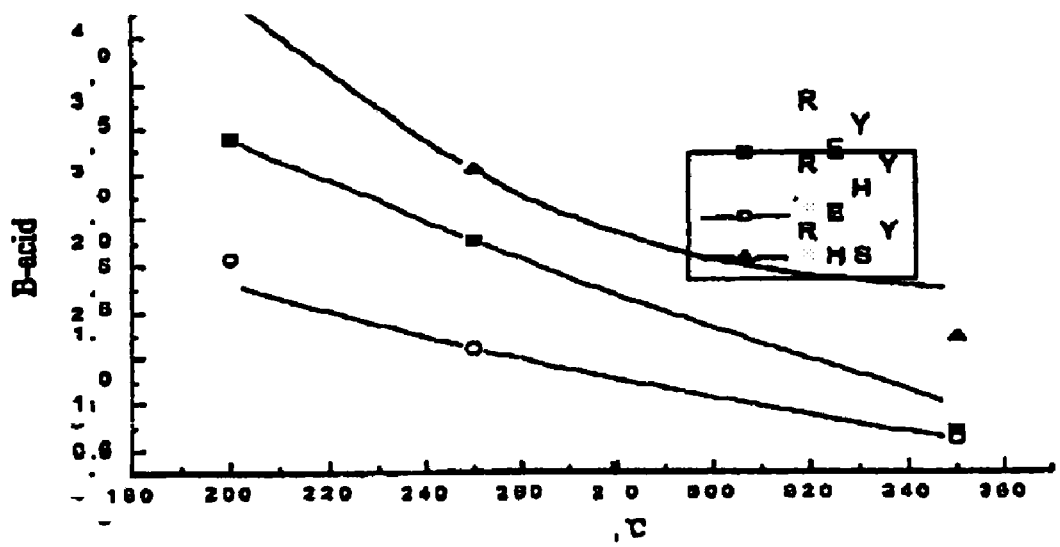
FIG. 2 is a graph of B-acid for the zeolite used in the catalyst after 100% steam-aging treatment at 800° C. for 17 hours.

NaY zeolite with a dry basis of 85% (a Si/Al ratio of 4.0, a unit call size of 2.473 nm, a $Al_2O_3$ content of 24.8%, a $Na_2O$ content of 16%, produced by Zhoucun Catalyst Factory, Qilu Petrochemical Company) was ion exchanged with a rare-earth solution in a ratio of $NaY:RECl_3:H_2O=1:0.21:10$ at 80~90° C. for 60 min, and dried till the water content was less than 7% and the $RE_2O_3$ content was 16%, in which $La_2O_3$ content was 4.16%, $Ce_2O_3$ content was 8.16%, and the content of other rare-earth oxides was 3.68%. In a ratio of $NaY:SiCl_4=1:0.5$, the ion exchanged NaY zeolite reacted with $SiCl_4$ gas carried by dry air at 300° C. for 5 hours, and purged with dry air for 20 min, and then washed and filtrated to obtain a sample, designated as RHSY-4. The physical-chemical parameters are listed in table 1. The spectra of the hydroxyl structure and the acidity graph of RHSY-4 characterized by FT-IR after 100% steam-aging treatment at 800° C. for 17 hours are shown in FIGS. 1 and 2 respectively.

EXAMPLE 5

REY zeolite with a dry basis of 85% (a $RE_2O_3$ content of 18.8%, in which a $La_2O_3$ content of 14.8%, a $Ce_2O_3$ content of 2.9%, a content of other rare-earth oxides of 1.1%, a unit cell size of 2.469 nm, a differential thermal collapse temperature of 980° C., a $Na_2O$ content of 2.7%, produced by Zhoucun Catalyst Factory, Qilu Petrochemical Company) was put into a reactor to be dried till the water content less than 5%. Then in a ratio of $REHY:SiCl_4=1:0.8$, the dried REY zeolite reacted with $SiCl_4$ gas carried by dry air at 350° C. for 120 min and purged with dry air for 20 min, and then washed and filtrated to obtain a sample, designated as RHSY-5. The physical-chemical parameters are listed in table 1.

EXAMPLE 6

NaY zeolite with a dry basis of 85% (a Si/Al ratio of 4.0, a unit cell size of 2.473 nm, a $Al_2O_3$ content of 24.8%, a $Na_2O$ content of 16%, produced by Zhoucun Catalyst Factory, Qilu Petrochemical Company) was ion exchanged with a rareearth solution in a ratio of NaY:RECl$_3$:H$_2$O=1:0.25:10 at 80~90° C. for 60 min, and the RE$_2$O$_3$, content was 16%, in which La$_2$O$_3$ content was 4.16%, Ce$_2$O$_3$ content was 8.16%, and the content of other rare-earth oxides was 3.68%. In a ratio of NaY:SiCl$_4$=1:0.4, the ion exchanged NaY zeolite reacted with SiCl$_4$ gas carried by dry air at 300° C. for 4 hours, and purged with dry air for 20 min, and then washed and filtrated to obtain a sample, designated as RHSY-6. The physical-chemical parameters are listed in table 1.

EXAMPLE 7

NaY zeolite with a dry basis of 75% (a Si/Al ratio of 5.05, a unit cell size of 2.466 nm, a Al$_2$O$_3$ content of 21.2%, a Na$_2$O content of 15.8%, produced by Zhoucun Catalyst Factory, Qilu Petrochemical Company) was ion exchanged with a rare-earth solution in a ratio of NaY:RECl$_3$:H$_2$O=1:0.20:10 at 80~95° C. for 40 min, then filtrated and washed. In a ratio of NaY:SiCl$_4$=1:0.3, the ion exchanged NaY zeolite reacted with SiCl$_4$ gas carried by dry air at 250° C. for 60 min and purged with dry air for 120 min, and then washed and filtrated to obtain a sample, designated as RHSY-7. The physical-chemical parameters are listed in table 1.

COMPARATIVE EXAMPLE 1

Using REY zeolite (a RE$_2$O$_3$ content of 16.6%, in which a La$_2$O$_3$ content of 12.9%, a Ce$_2$O$_3$ content of 2.1%, a content of other rare-earth oxides of 1.1%, a unit cell size of 2.470 nm, a differential thermal collapse temperature of 980° C., a Na$_2$O content of 2.7%, produced by Zhoucun Catalyst Factory, Qilu Petrochemical Company) as comparative sample, its physical-chemical parameters are listed in table 1. The spectra of the hydroxyl structure and the acidity graph of the REY zeolite characterized by FT-IR after 100% steam-aging treatment at 800° C. for 17 hours are shown in FIGS. 1 and 2 respectively.

COMPARATIVE EXAMPLE 2

Using REHY zeolite (a RE$_2$O$_3$ content of 13.6%, in which a La$_2$O$_3$ content of 11.4%, a Ce$_2$O$_3$ content of 1.9%, a content of other rare-earth oxides of 0.3%, a unit cell size of 2.469 nm, a differential thermal collapse temperature of 985° C., a Na$_2$O content of 4.4%, produced by Zhoucun Catalyst Factory, Qilu Petrochemical Company) as comparative sample, its physical-chemical parameters are listed in table 1. The spectra of the hydroxyl structure and the acidity graph of the REY zeolite characterized by FT-IR after 100% steam-aging treatment at 800° C. for 17 hours are shown in FIGS. 1 and 2 respectively.

TABLE 1

| Example | Zeolite code | Original unit cell size (nm) | RE$_2$O$_3$ (w %) | Na$_2$O (w %) | DTA (° C.) | Equilibrium unit cell size (nm) |
|---|---|---|---|---|---|---|
| 1 | RHSY-1 | 2.440 | 4 | 0.48 | 1010 | 2.435 |
| 2 | RHSY-2 | 2.455 | 7 | 0.43 | 1020 | 2.438 |
| 3 | RHSY-3 | 2.457 | 8.9 | 0.35 | 1016 | 2.442 |
| 4 | RHSY-4 | 2.460 | 10 | 0.49 | 1018 | 2.445 |
| 5 | RHSY-5 | 2.465 | 15.0 | 0.43 | 1020 | 2.451 |
| 6 | RHSY-6 | 2.459 | 13.2 | 0.32 | 1010 | 2.448 |
| 7 | RHSY-7 | 2.450 | 11.8 | 0.30 | 1001 | 2.445 |
| Comparative example 1 | REY | 2.470 | 16.6 | 2.7 | 980 | 2.430 |
| Comparative example 2 | REHY | 2.469 | 13.6 | 4.4 | 985 | 2.426 |

The following examples are used to illustrate the preparing procedure of the catalyst disclosed in present invention.

EXAMPLE 8

2.0 kg Suzhou Kaolin (83% dry basis, produced by Chinese Kaolin Company) was added into 10.7 kg decationized water and stirred for 1.5 hours. 0.8 kg pseudoboehmite (65% dry basis, produced by Shandong Aluminium Company) was added and stirred for another 1 hour. 0.036 L HCl (industry grade) was added and stirred for 10 min. The obtained slurry was heated to 60° C. and aged for 1 hour. 2 kg alumina sol (an Al$_2$O$_3$ content of 21.5%, produced by Qilu Catalyst Factory) was mixed with the slurry and stirred for 1 hour. Finally 1.8 kg rare-earth Y-zeolite RHSY-1 (80% dry basis) prepared in Example 1 was added and stirred for 0.5 hour. The catalyst was obtained by spray drying and designated as RC-1. The properties of the catalyst are shown in Table 2.

COMPARATIVE EXAMPLE 3

This comparative example is used to illustrate the preparing procedure of the catalyst using REUSY as Y-zeolite.

2.1 kg Suzhou Kaolin (83% dry basis, produced by Chinese Kaolin Company) was added into 10.7 kg decationized water and stirred for 1.5 hours. 0.65 kg pseudoboehmite (65% dry basis, produced by Shandong Aluminium Company) was added and stirred for another 1 hour. 0.036 L HCl (industry grade) was added and stirred for 10 min. The obtained slurry was heated to 60° C. and aged for 1 hour. 2 kg alumina sol (an Al$_2$O$_3$ content of 21.5%, produced by Qilu Catalyst Factory) was mixed with the slurry and stirred homogenously. The mixed rare-earth chloride solution (concentration of RE$_2$O$_3$ 285 g/l) was added, and ammonia was used to adjust pH to about 3 and stirred for 0.5 hour. Finally 2.3 kg REUSY zeolite (a unit cell size of 2.450 nm, a RE$_2$O$_3$ content of 3%, a Na$_2$O content of 1.0%, 78% dry basis, produced by Qilu Catalyst Factory) was added and stirred for 0.5 hour. The catalyst was obtained by spray drying and designated as DM-1. The properties of the catalyst are shown in Table 3.

EXAMPLE 9

1.9 kg Suzhou Kaolin (83% dry basis, produced by Chinese Kaolin Company) was added into 20 kg decationized water and stirred for 1.5 hours. 1.5 kg pseudoboehmite (65% dry basis, produced by Shandong Aluminium Company) was added and stirred for another 1 hour. 0.036 L HCl (industry grade) was added and stirred for 10 min. The obtained slurry was heated to 60° C. and aged for 1 hour. 1.9 kg rare-earth Y-zeolite RHSY-2 (75% dry basis) prepared in Example 2 was added and stirred for 0.5 hour. The catalyst was obtained by spray drying and designated as RC-2. The properties of the catalyst are shown in Table 2.

COMPARATIVE EXAMPLE 4

This comparative example is used to illustrate the preparing procedure of the catalyst using REHY and REUSY as Y-zeolite.

9.3 kg Suzhou Kaolin (83% dry basis, produced by Chinese Kaolin Company) was added into 16 kg decationized water and stirred for 1 hour. 1.2 kg pseudoboehmite (65% dry basis, produced by Shandong Aluminium Company) was added and stirred for another 1 hour. 0.16 L HCl (industry grade) was added and stirred for 10 min. The obtained slurry was heated to 60° C. and aged for 1 hour. 1.9 kg alumina sol (an $Al_2O_3$ content of 21.5%, produced by Qilu Catalyst Factory) was mixed with the slurry and stirred for 0.5 hour. Then 5.1 kg REHY zeolite (a unit cell size of 2.469 nm, a $RE_2O_2$ content of 8.8%, a $Na_2O$ content of 4.2%, 85% dry basis, produced by Qilu Catalyst Factory) prepared by hydrothermal method and ion exchange process, and 2.7 kg REUSY zeolite (a unit cell size of 2.450 nm, a $RE_2O_3$ content of 3%, a $Na_2O$ content of 1.0%, 78% dry basis, produced by Qilu Catalyst Factory) were added and stirred for 0.5 hour. The catalyst was obtained by spray drying and washing with decationized water, designated as DM-2. The properties of the catalyst are shown in Table 3.

EXAMPLE 10

1.7 kg Suzhou Kaolin (83% dry basis, produced by Chinese Kaolin Company) was added into 15 kg decationized water and stirred for 1 hours. Then 4 kg alumina sol (an $Al_2O_3$ content of 21.5%, produced by Qilu Catalyst Factory) was added and stirred for 1 hour. Finally 1.4 kg rare-earth Y-zeolite RHSY-3 (85% dry basis, a $RE_2O_3$ content of 8.9%, a $Na_2O$ content of 0.48%, a differential thermal collapse temperature of 1015° C.) prepared in Example 3 was added and stirred for 0.5 hour. The catalyst was obtained by spray drying and designated as RC-3. The properties of the catalyst arc shown in Table 2.

EXAMPLE 11

2.2 kg Suzhou Kaolin (83% dry basis, produced by Chinese Kaolin Company) was added into 24 kg decationized water and stirred for 1.5 hours. 1.2 kg pseudoboehmite (65% dry basis, produced by Shandong Aluminium Company) was added and stirred for another 1 hour. 0.04 L HCl (industry grade) was added and stirred for 10 min. The obtained slurry was heated to 60° C. and aged for 1 hour. 1.9 kg alumina sol (an $Al_2O_3$ content of 21.5%, produced by Qilu Catalyst Factory) was mixed with the slurry and stirred for 0.5 hour. Then 2 kg rare-earth Y-zeolite RHSY-4 (78% dry basis) prepared in Example 4 was added and stirred for 1 hour. The catalyst was obtained by spray drying and designated as RC-4. The properties of the catalyst are shown in Table 2.

COMPARATIVE EXAMPLE 5

This comparative example is used to illustrate the preparing procedure of the comparative catalyst using P-REHY an ZRP as zeolite, using alumina sol and pseudoboehmite as binder.

1.6 kg Suzhou Kaolin (83% dry basis, produced by Chinese Kaolin Company) was added into 21 kg decationized water and stirred for 1 hour. Then 1.2 kg pseudoboehmite (65% dry basis, produced by Shandong Aluminium Company) was added and stirred for another 1 hour. Finally 0.04 L HCl (industry grade) was added and stirred for 10 min. The obtained slurry was heated to 60° C. and aged for 1 hour. 1.9 kg alumina sol (an $Al_2O_3$ content of 21.5%, produced by Qilu Catalyst Factory) was mixed with the slurry and stirred for 1 hour. Then 1.8 kg phosphorus rare-earth hydrogen Y-zeolite P-REHY-1 (a unit cell size of 2.469 nm, a $RE_2O_3$ content of 8.2%, a $Na_2O$ content of 1.1%, a $P_2O_5$ content of 2.4%, 85% dry basis, produced by Qilu Catalyst Factory) and 0.09 kg ZRP zeolite (a Si/Al ratio of 50, a $Na_2O$ content less than 1%, 90% dry basis, produced by Qilu Catalyst Factory) were added and stirred for 1 hour. The catalyst was obtained by spray drying and washing with decationized water, designated as DM-3. The properties of the catalyst are shown in Table 3.

EXAMPLE 12

2.2 kg Suzhou Kaolin (73% dry basis, produced by Chinese Kaolin Company) was added into 16.7 kg decationized water and stirred for 1 hour. Then 4.7 kg alumina sol (an $Al_2O_3$ content of 21.5%, produced by Qilu Catalyst Factory) was added and stirred for 1 hour. Finally 1.1 kg rare-earth Y-zeolite RHSY-5 (78% dry basis) prepared in Example 5 and 0.06 kg ZRP zeolite (a Si/Al ratio of 50, a $Na_2O$ content less than 1%, 90% dry basis, produced by Qilu Catalyst Factory) were added and stirred for 1 hours. The catalyst was obtained by spray drying and designated as RC-5. The properties of the catalyst are shown in Table 2.

COMPARATIVE EXAMPLE 6

This comparative example is used to illustrate the preparing procedure of the catalyst using P-REHY and ZRP as zeolite.

2.2 kg Suzhou Kaolin (73% dry basis, produced by Chinese Kaolin Company) was added into 16.7 kg decationized water and stirred for 1 hour. Then 4.7 kg alumina sol (an $Al_2O_3$ content of 21.5%, produced by Qilu Catalyst Factory) was added and stirred for 1 hour. Finally 2.2 kg phosphorus rare-earth hydrogen Y-zeolite P-REHY-2 zeolite (a unit cell size of 2.467 nm, a $RE_2O_3$ content of 9%, a $Na_2O$ content of 1.1%, a $P_2O_3$ content of 2.0%, 85% dry basis, produced by Qilu Catalyst Factory) and 0.06 kg ZRP zeolite (a Si/Al ratio of 50, a $Na_2O$ content less than 1%, 90% dry basis, produced by Qilu Catalyst Factory) were added and stirred for 1 hour. The catalyst was obtained by spray drying and washing with decationized water, designated as DM-4. The properties of the catalyst are shown in Table 3.

EXAMPLE 13

2 kg Suzhou Kaolin (83% dry basis, produced by Chinese Kaolin Company) was added into 15 kg decationized water and stirred for 1 hour. Then 3.9 kg silica sol (a $SiO_2$ content of 15.5%, produced by Beijing Changhong Middle School Chemical Factory) was mixed homogenously. Finally 0.72 kg rare-earth Y-zeolite RHSY-5 (78% dry basis) prepared in Example 5 was added and stirred for 1 hour. The catalyst was obtained by spray drying and designated as RC-6. The properties of the catalyst are shown in Table 2.

EXAMPLE 14

3.7 kg Suzhou Kaolin (73% dry basis, produced by Chinese Kaolin Company) was added into 20 kg decationized water and stirred for 1.5 hours. Then 1.5 kg pseudoboehmite (65% dry basis, produced by Shandong Aluminium Company) was added and stirred for another 1 hour. Finally 0.25 L HCl (industry grade) was added and stirred for 10 min. The obtained slurry was heated to 60° C. and aged for 1 hour. Then 1.5 kg rare-earth Y-zeolite RHSY-6 (78% dry basis) prepared in Example 6 was added and stirred for 1 hour. The catalyst was obtained by spray drying and designated as RC-7. The properties of the catalyst are shown in Table 2.

EXAMPLE 15

2.2 kg Suzhou Kaolin (73% dry basis, produced by Chinese Kaolin Company) was added into 12 kg decationized water and stirred for 1.5 hours. Then 1.2 kg pseudoboehmite (65% dry basis, produced Shandong Aluminium Company) was added and stirred for another 1 hour. Finally 0.19 L HCl (industry grade) was added and stirred for 10 min. The obtained slurry was heated to 60° C. and aged for 1 hour. Then 0.58 kg rare-earth Y-zeolite RHSY-7 (78% dry basis) prepared in Example 7 was added and stirred for 1 hour. The catalyst was obtained by spray drying and designated as RC-8. The properties of the catalyst are shown in Table 2.

COMPARATIVE EXAMPLE 8

This comparative example is used to illustrate the preparing procedure of the catalyst using as zeolite.

2.3 kg Suzhou Kaolin (73% dry basis, produced by Chinese Kaolin Company) was added into 20 kg decationized water and stirred for 1 hour. Then 1 kg pseudoboehmite (65% dry basis, produced by Shandong Aluminium Company) was added and stirred for another 1 hour. Finally 0.2 L HCl (industry grade) was added and stirred for 10 min. The obtained slurry was heated to 60° C. and aged for 1 hour. 2.3 kg alumina sol (an $Al_2O_3$ content of 21.5%, produced by Qilu Catalyst Factory) was mixed with the slurry and stirred for 0.5 hour. Then 2.1 kg REHY zeolite (a unit cell size of 2.469 nm, a $RE_2O_3$ content of 8.2%, a $Na_2O$ content of 4.2%, 83% dry basis, produced by Qilu Catalyst Factory) was added and stirred for 1 hour. The catalyst was obtained by spray drying and washing with decationized water, designated as DM-5. The properties of the catalyst are shown in Table 3.

COMPARATIVE EXAMPLE 9

This comparative example is used to illustrate the preparing procedure of the comparative catalyst using REY as zeolite.

1.6 kg Suzhou Kaolin (85% dry basis, produced by Chinese Kaolin Company) was added into 16 kg decationized water and stirred for 1 hour. Then 1.2 kg pseudoboehmite (65% dry basis, produced by Shandong Alumina Company) was added and stirred for another 1 hour. Finally 0.16 L HCl (industry grade) was added and stirred for 10 min. The obtained slurry was heated to 60° C. and aged for 1 hour. 1.9 kg alumina sol (an $Al_2O_3$ content of 21.5%, produced by Qilu Catalyst Factory) was mixed with the slurry and stirred for 0.5 hour. Then 2.1 kg rare-earth zeolite REY (a unit cell size of 2.467 nm, a $RE_2O_3$, content of 13.7%, a $Na_2O$ content of 4.2%, 90% dry basis, produced by Qilu Catalyst Factory) was added and stirred for 1 hour. The catalyst was obtained by spray drying and washing with decationized water, designated as DM-6. The properties of the catalyst are shown in Table 3.

EXAMPLE 16

1.6 kg Suzhou Kaolin (73% dry basis, produced by Chinese Kaolin Company) was added into 15 kg decationized water and stirred for 1 hour. Then 1.2 kg pseudoboehmite (65% dry basis, produced by Shandong Aluminium Company) was added and stirred for another 1 hour. Finally 0.19 L HCl (industry grade) was added and stirred for 10 min. The obtained slurry was heated to 60° C. and aged for 1 hour. 0.7 kg alumina sol (an $Al_2O_3$ content of 21.5%, produced by Qilu Catalyst Factory) was mixed with the slurry and stirred for 0.5 hour. Then 1.27 kg rare-earth Y-zeolite RHSY-3 (85% dry basis) prepared in Example 3 was added and stirred for 1 hour. The catalyst was obtained by spray drying and designated as RC-9. The properties of the catalyst are shown in Table 2.

TABLE 2

| Example | Catalyst | $Al_2O_3$ (w %) | $RE_2O_3$ (w %) | $Na_2O$ (w %) | Specific surface area (m²/g) | nitrogen adsorption $V_{Pore}$ | nitrogen adsorption $V_{micro}$ | abrasive index |
|---|---|---|---|---|---|---|---|---|
| 8 | RC-1 | 42.9 | 1.4 | 0.17 | 266 | 0.184 | 0.094 | 0.2 |
| 9 | RC-2 | 47.9 | 2.4 | 0.12 | 268 | 0.192 | 0.087 | 1.2 |
| 10 | RC-3 | 40.9 | 3.1 | 0.16 | 290 | 0.181 | 0.110 | 0.2 |
| 11 | RC-4 | 55 | 3.5 | 0.14 | 212 | 0.171 | 0.55 | 1.4 |
| 12 | RC-5 | 49 | 3.6 | 0.17 | 254 | 0.190 | 0.080 | 1.6 |
| 13 | RC-6 | 48 | 3.0 | 0.09 | 260 | 0.184 | 0.094 | 1.4 |
| 14 | RC-7 | 50 | 3.2 | 0.06 | 270 | 0.190 | 0.090 | 1.2 |
| 15 | RC-8 | 48 | 1.8 | 0.12 | 265 | 0.194 | 0.98 | 1.7 |
| 16 | RC-9 | 46.6 | 3.0 | 0.18 | 303 | 0.203 | 0.089 | 2.0 |

TABLE 3

| Comparative example | Catalyst | $Al_2O_3$ (w %) | $RE_2O_3$ (w %) | $Na_2O$ (w %) | Specific surface area (m²/g) | nitrogen adsorption $V_{Pore}$ | nitrogen adsorption $V_{micro}$ | Abrasive index |
|---|---|---|---|---|---|---|---|---|
| 1 | DM-1 | 49.5 | 1.7 | 0.35 | 268 | 0.178 | 0.083 | 2.3 |
| 2 | DM-2 | 55 | 2.5 | 0.38 | 263 | 0.210 | 0.086 | 2.4 |
| 3 | DM-3 | 51 | 3.2 | 0.38 | 272 | 0.188 | 0.073 | 2.3 |

TABLE 3-continued

| Comparative example | Catalyst | $Al_2O_3$ (w %) | $RE_2O_3$ (w %) | $Na_2O$ (w %) | Specific surface area (m²/g) | nitrogen adsorption $V_{Pore}$ | nitrogen adsorption $V_{micro}$ | Abrasive index |
|---|---|---|---|---|---|---|---|---|
| 4 | DM-4 | 50 | 3.6 | 0.32 | 262 | 0.199 | 0.073 | 1.7 |
| 5 | DM-5 | 57 | 3.2 | 0.22 | 260 | 0.199 | 0.073 | 1.8 |
| 6 | DM-6 | 57 | 5.5 | 0.16 | 242 | 0.181 | 0.067 | 1.9 |

The following examples are used to illustrate the cracking properties of the catalyst disclosed in present invention for all kinds of hydrocarbon raw oils.

EXAMPLE 17

The catalytic cracking of raw oil I (Liaohe wax oil, its properties shown in Table 4) was carried out in a fixed fluid-bad unit at 500° C. with a weight hourly space velocity (WHSV) of 12 h$^{-1}$, a catalyst-oil ratio of 5, and a water content (based on raw material) of 10% by weight, by using catalysts RC-1, RC-3 (with a rare-earth Y-zeolite content of 35% by weight) and the comparative catalyst DM-1 (with a zeolite content of 40% by weight) disclosed in present invention as catalysts. Prior to the test each catalyst to be tested was treated at 800° C. for 8 hours under a 100% steam atmosphere. The reaction results are listed in Table 5.

TABLE 4

| Raw oil I | |
|---|---|
| Density, g/cm³(20° C.) | 0.9275 |
| Viscosity, mm²/(50° C.) | 52.15 |
| (80° C.) | 14.93 |
| Freeze point, ° C. | 28 |
| Carbon residue, w % | 0.25 |
| Basic nitrogen, ppm | 795 |
| Element analysis, w % | |
| C | 86.6 |
| H | 12.04 |
| S | 0.32 |
| N | 1 |
| PNOA analysis, w % | |
| Paraffin | 67.5 |
| Aromatic | 23 |
| Colloid | 9.5 |
| Bitumen | 0 |
| Vacuum distillation range, ° C. | |
| IBP | 265 |
| 5% | 320 |
| 10% | 343 |
| 30% | 398 |
| 50% | 429 |
| 70% | 455 |
| 90% | 504 |

TABLE 5

| | | Catalyst code | | |
|---|---|---|---|---|
| | | RC-3 | RC-1 | DM-1 |
| Product distribution w % | Dry gas | 2.12 | 2.01 | 19.0 |
| | LPG | 14.23 | 13.04 | 14.05 |
| | GLN | 52.38 | 49.33 | 47.15 |
| | LCO | 17.36 | 19.57 | 19.93 |

TABLE 5-continued

| | Catalyst code | | |
|---|---|---|---|
| | RC-3 | RC-1 | DM-1 |
| Heavy oil | 9.57 | 13.01 | 13.57 |
| Coke | 4.24 | 3.04 | 3.40 |
| Conversion | 73.07 | 67.42 | 66.50 |
| Light oil yield | 69.74 | 68.90 | 67.08 |
| LPG + GLN + LCO | 84.07 | 81.94 | 81.13 |

As seen from Table 5, the catalysts RC-1 and RC-3 provided in present invention have high conversion for heavy oil. The un-converted content of heavy oil is less than that of comparative catalyst DM-1, especially for RC-3 whose unconverted content of heavy oil is lower than that of comparative catalyst DM-1 by 4%. The yield of light oil is higher than that of comparative catalyst by about 1-2%. From the view of the product distribution, the catalytic selectivity for gasoline, coke and dry gas is better than that of the comparative catalyst at almost the same conversion. So the catalyst disclosed in present invention is an excellent cracking catalyst for heavy oil.

EXAMPLE 18

The catalytic cracking of raw oil II (Wuhan three-blended-residuum, its properties shown in Table 6) was carried out in a fixed fluid-bed unit at 500° C. with a catalyst-oil ratio of 5 by using catalysts RC-1, RC-3 and the comparative catalyst DM-1 as catalysts. Prior to the test each catalyst to be tested was treated at 800° C. for 4 hours under a 100% steam atmosphere. The obtained crude gasoline was analysed by chromatographic PNOA and the results are listed in Table 7.

TABLE 6

| Raw oil II | |
|---|---|
| Density, g/cm³(20° C.) | 0.9070 |
| Viscosity, mm²/(80° C.) | 17.17 |
| Aniline point, ° C. | 95.8 |
| Pour point, ° C. | 43 |
| Refractive index, 20° C. | 1.5217 |
| Conradson Carbon, w % | 3.1 |
| Basic nitrogen, ppm | 1010 |
| Element analysis, w % | |
| C | 86.37 |
| H | 12.53 |
| S | 0.80 |
| N | 0.29 |
| Ni, ppm | 7.0 |
| V, ppm | 0.8 |

TABLE 6-continued

| Raw oil II | |
|---|---|
| Distillation rang, °C. | |
| IBP | 241 |
| 10% | 347 |
| 30% | 413 |
| 50% | 450 |
| 70% | 493 |
| 80% | 535 |
| 90% | — |

TABLE 7

| Catalyst | n-Paraffin NP | i-Paraffin ZP | Olefin O | Naphthene N | Aromatic A | Octane number RON |
|---|---|---|---|---|---|---|
| DM-1 | 5.55 | 39.41 | 33.34 | 8.26 | 13.34 | 90.1 |
| RC-1 | 4.79 | 51.59 | 17.3 | 8.26 | 18.06 | 91.4 |
| RC-3 | 5.51 | 55.14 | 12.97 | 6.26 | 20.12 | 90 |

As seen from Table 7, the catalysts RC-1 and RC-3 provided in present invention have an obvious effect on the decrease of the olefin content of gasoline. Their olefin contents of gasoline can reach 17.3% and 12.97% respectively, lower than the olefin content 33.34% of the comparative catalyst DM-1. The contents of i-paraffin for RC-1 and RC-3 are 51.59% and 55.14%, higher than the content 39.41% of the comparative catalyst, while remaining relatively high octane numbers. So the catalyst disclosed in present invention is a desirable catalyst for decreasing the olefin content of gasoline.

EXAMPLE 19

The catalytic cracking of raw oil III (Liaohe Anshan wax oil, its properties shown in Table 8) was carried out in a fixed fluif-bed unit at 510° C. with a weight hourly space velocity (WHSV) of 20 $h^{-1}$ and a catalyst-oil ratio of 5 by using the catalyst RC-2 and the comparative catalyst DM-2 disclosed in present invention as catalysts. Prior to the test each catalyst to be tested was treated at 800° C. for 4 hours under a 100% steam atmosphere. The reaction results are listed in Table 9.

TABLE 8

| Raw oil III | |
|---|---|
| Density, g/cm$^{-3}$(20° C.) | 0.9268 |
| Viscosity, mm$^2$/(100° C.) | 9.072 |
| Freeze point, °C. | +31 |
| Aniline point, °C. | 78.5 |
| Carbon residue, w % | 0.27 |
| Paraffin, w % | 62.0 |
| Aromatic, w % | 26.6 |
| Colloid, w % | 11.3 |
| Bitumen, w % | 0.1 |
| Distillation rang type | D1160 |
| Element analysis, w % | |
| C | 87.03 |
| H | 12.15 |
| S | 0.26 |
| N | 0.28 |
| Basic nitrogen, ppm | 865 |
| IBP | 264 |
| 5% | 320 |
| 10% | 350 |
| 30% | 411 |

TABLE 8-continued

| Raw oil III | |
|---|---|
| 50% | 444 |
| 70% | 468 |
| 90% | 515 |

TABLE 9

| Analysis item | | Catalyst code | |
|---|---|---|---|
| | | RC-2 | DM-2 |
| Product distribution w % | Dry gas | 2.0 | 2.0 |
| | LPG | 12.8 | 14.8 |
| | $C_3^- + C_4^-$ | 8.0 | 9.2 |
| | GLN | 50.5 | 47.2 |
| | LCO | 21.5 | 22.0 |
| | Heavy oil | 7.8 | 9.1 |
| | Coke | 4.9 | 4.5 |
| | Conversion | 70.2 | 68.5 |
| | RON | 89.0 | 89.4 |
| | n-Paraffin | 4.23 | 4.39 |
| | i-Paraffin | 43.23 | 40.49 |
| | olefin | 19.05 | 25.04 |
| | Naphthene | 8.23 | 9.43 |
| | Aromatic | 25.28 | 20.65 |
| | MA | 82 | 77 |

As seen from Table 9, comparing to the comparative catalyst DM-2 (two zeolites, with a zeolite content of 41% by weight), the catalyst RC-2 (with a zeolite content of 32% by weight) provided in present invention has high conversion for heavy oil. The yield of light oil is higher than that of the comparative catalyst by almost 2.8%. At almost the same octane numbers the olefin content is decreased 6%, showing high activity for the decrease of the olefin content.

EXAMPLE 20

The catalytic cracking of raw oil IV with inferior quality (Liaohe wax oil:Liaohe cooking gas oil:Daqing vacuumed residuum=55:20:25, its properties shown in Table 10) was carried out in a fixed fluid-bed unit at 500° C. with a weight hourly space velocity (WHSV) of 10 $h^{-1}$ and a catalyst-oil ratio of 6 by using the catalysts RC-2, RC-9 and the comparative catalyst DM-2 disclosed in present invention as catalysts. Prior to the test each catalyst to be tested was treated at 800° C. for 12 hours under a 100% steam atmosphere. The reaction results are listed in Table 11.

The crude gasoline obtained by using catalyst RC-9 and comparative catalyst DM-2 in a fixed fluid-bed unit was analysed by PNOA analysis and the results are listed in Table 12.

TABLE 10

| Raw oil IV | |
|---|---|
| Density, g/cm$^{-3}$(20° C.) | 0.9213 |
| Carbon residue, w % | 23 |
| Freeze point, °C. | 33.0 |
| Viscosity, mm$^2$/(80° C.) | 14.00 |
| Refractive index, (70° C.) | 1.4974 |
| Aniline point, °C. | 97.2 |
| Element analysis, w % | |
| C | 86.86 |
| H | 12.29 |
| S | 0.24 |
| N | 0.31 |

TABLE 10-continued

Raw oil IV

| PNOA analysis, w % | |
|---|---|
| Paraffin | 56.0 |
| Aromatic | 27.8 |
| Colloid | 16.2 |
| Bitumen | 0.0 |
| Metal content, m % | |
| Fe | 5.0 |
| Ni | 3.6 |
| Cu | <0.1 |
| V | <0.1 |
| Ca | 2.5 |
| Distillation, ° C. | |
| IBP | 212 |
| 5% | 329 |
| 10% | 363 |
| 30% | 422 |
| 50% | 458 |
| 70% | 518 |

TABLE 11

| | Catalyst code | | |
|---|---|---|---|
| | RC-2 | RC-9 | DM-2 |
| WHSV, $h^{-1}$ | 10.0 | 9.8 | 9.8 |
| $H_2$—$C_2$ | 2.01 | 2.01 | 1.69 |
| $C_3$-$C_4$ | 14.64 | 13.91 | 15.33 |
| GLN($C_5$-221° C.) | 54.94 | 57.80 | 52.86 |
| LCO(221-300° C.) | 12.92 | 11.52 | 12.97 |
| Heavy oil (heavy oil ° C.) | 8.15 | 7.04 | 9.73 |
| Coke | 7.34 | 7.72 | 7.42 |
| Conversion, w % | 78.93 | 81.44 | 77.30 |
| Light oil yield, w % | 67.86 | 69.32 | 65.83 |
| Product selectivity | | | |
| $H_2$—$C_2$, Conversion | 0.026 | 0.025 | 0.022 |
| $C_3$ + $C_4$, Conversion | 0.185 | 0.171 | 0.198 |
| GLN, Conversion | 0.696 | 0.710 | 0.684 |
| Coke, Conversion | 0.093 | 0.095 | 0.096 |
| Octane number (GC) | | | |
| MON | 78.7 | 78.1 | 78.6 |
| RON | 89.4 | 88.6 | 89.1 |

As seen from Table 11, the catalysts RC-2 and RC-9 (with a zeolite content of 32% and 35% by weight respectively) provided in present invention have much higher cracking activity for heavy oil than that of the comparative catalyst DM-2 (with a zeolite content of 41% by weight) under the conditions of lower zeolite content and same supporter. The yield of light oil is higher than that of the comparative catalyst by almost 2~3.5%. Both the selectivity of gasoline and the selectivity of coke are better than that of the comparative catalyst.

TABLE 12

| | PNOA analysis, w % | | | |
|---|---|---|---|---|
| Catalyst | Paraffin | Olefin | Naphthene | Aromatic |
| DM-2 | 38.49 | 26.12 | 10.30 | 25.09 |
| RC-9 | 42.55 | 22.59 | 9.65 | 25.21 |

As seen from Table 12, the catalyst provided in present invention still shows the activity for decrease of the olefin content even used in the cracking of the inferior raw oil.

EXAMPLE 21

The catalytic cracking of raw oil V (Daqing atmospheric residuum:Aman=20:80) was carried out in a fixed fluid-bed unit at 520° C. with a weight hourly space velocity (WHSV) of 30 $h^{-1}$ and a catalyst-oil ratio of 4 by using the catalyst RC-4 and the comparative catalysts DM-5 and DM-6 disclosed in present invention as catalysts. Prior to the test each catalyst to be tested was treated at 800° C. for 4 hours under a 100% steam atmosphere. The reaction results are listed in Table 13.

TABLE 13

| | | Catalyst code | | |
|---|---|---|---|---|
| | Analysis item | RC-4 | DM-5 | DM-6 |
| Zeolite | Type | RHSY | REHY | REY |
| | Content, % | 35 | 35 | 35 |
| | $RE_2O_3$, w % | 3.5 | 2.8 | 5.5 |
| Product | Dry gas | 1.6 | 2.0 | 1.9 |
| distribution | LPG | 12.0 | 12.4 | 11.7 |
| w % | GLN | 49.2 | 48.2 | 49.0 |
| | LCO | 21.4 | 20.8 | 21.1 |
| | Heavy oil | 9.6 | 9.5 | 9.0 |
| | Coke | 5.7 | 6.6 | 6.7 |
| | Conversion | 68.5 | 69.2 | 69.3 |
| | GLN + LCO | 70.6 | 69 | 70.1 |
| | GLN + LCO + LPG | 82.6 | 81.4 | 81.8 |
| | RON | 88.3 | 89.5 | 89.9 |
| | Olefin | 25.82 | 27.65 | 23.69 |

As seen from Table 13, comparing to the comparative catalysts DM-5 with REHY zeolite and DM-6 with REY zeolite, the catalyst provided in present invention has high yield of light oil at the similar conversion and the activity to decrease the olefin content as well as the excellent selectivity of the coke.

EXAMPLE 22

The catalytic cracking of raw oil VI (Daqing atmospheric residuum, its properties shown in Table 14) was carried out in a fixed fluid-bed unit at 500° C. with a weight hourly space velocity (WHSV) of 30 $h^{-1}$ and a catalyst-oil ratio of 4 by using the catalyst RC-4 and the comparative catalysts DM-3 (catalyst special for decreasing the olefin content) disclosed in present invention as catalysts. Prior to the test each catalyst to be tested was treated at 800° C. for 8 hours under a 100% steam atmosphere. The reaction results are listed in Table 15.

TABLE 14

Raw oil VI

| Density, g/$cm^{-3}$(20° C.) | 0.8906 |
|---|---|
| Viscosity, $mm^2$/(80° C.) | 44.18 |
| $mm^2$/(80° C.) | 24.84 |
| Freeze point, ° C. | 43 |
| Aniline point, ° C. | >105 |
| Conradson carbon, w % | 4.3 |
| C/$O_2$, mol/mol | 0.55 |
| Bromine value, gBr/100 g | 3.6 |
| Refractive index, $n_D^{20}$ | 1.4957 |

TABLE 14-continued

Raw oil VI

| Element analysis, w % | |
|---|---|
| C | 86.54 |
| H | 13.03 |
| S | 0.3 |
| N | 0.13 |
| PNOA analysis, w % | |
| Paraffin | 51.2 |
| Aromatic | 29.7 |
| Colloid | 18.3 |
| Bitumen | 0.8 |
| Distillation range, ° C. | |
| IBP | |
| 5% | 282 |
| 10% | 351 |
| 30% | 370 |
| 50% | 482 |
| 70% | 353 |

TABLE 15

| | Catalyst code | |
|---|---|---|
| Analysis item | RC-4 | DM-4 |
| $RE_2O_3$, w % | 3.2 | 3.6 |
| LPG | 11.2 | 15.5 |
| GLN | 51.9 | 50.1 |
| LCO | 19.5 | 19.1 |
| Heavy oil | 8.9 | 7.3 |
| Coke | 7.6 | 7.5 |
| Conversion | 71.1 | 73.1 |
| GLN + LCO | 71.4 | 69.2 |
| RON | 86.3 | 89.0 |
| n-Paraffin | 5.30 | 4.28 |
| i-Paraffin | 45.61 | 43.05 |
| Olefin | 28.33 | 33.95 |
| Naphthene | 10.64 | 9.70 |
| Aromatic | 10.12 | 9.03 |
| MA | 69 | 73 |

As seen from Table 15, even the catalyst RC-4 disclosed in present invention has lower zeolite content than the comparative catalyst DM-4 by 5% and has no ZRP zeolite. it has high conversion for heavy oil. The yield of light oil is higher than that of the comparative catalyst by almost 2% and the olefin content is lower than that of the comparative catalyst by 5%. The catalyst possesses the activity to decrease the olefin content.

EXAMPLE 23

The micro activity test on heavy oil was carried out by using the catalysts RC-5, RC-6, RC-7 and the comparative catalyst DM-3 as catalysts. Prior to the test each catalyst to be tested was treated at 800° C. for 17 hours under a 100% steam atmosphere. The reaction results are listed in Table 16.

TABLE 16

| | | Catalyst code | | | |
|---|---|---|---|---|---|
| Analysis item | | RC-5 | RC-6 | RC-7 | DM-3 |
| Zeolite content (relative) | | 0.60 | 0.75 | 0.60 | base* |
| Product | Gas | 19.8 | 19.5 | 19.0 | 23.4 |
| distribution | GLN | 53.0 | 53.2 | 54.8 | 47.5 |
| w % | LCO | 17.4 | 16.9 | 16.6 | 17.1 |

TABLE 16-continued

| | Catalyst code | | | |
|---|---|---|---|---|
| Analysis item | RC-5 | RC-6 | RC-7 | DM-3 |
| Coke | 1.6 | 1.6 | 1.7 | 1.5 |
| Heavy oil | 8.2 | 8.8 | 7.9 | 10.5 |
| Conversion | 74.4 | 74.3 | 75.5 | 72.4 |
| Light oil yield | 70.4 | 70.1 | 71.4 | 64.6 |
| $C_4^0/C_4^=$ | 1.19 | 1.05 | 1.0 | 0.81 |

*The base is 40%.

As seen from Table 16, the catalyst disclosed in present invention still has high conversion for heavy oil even with much lower zeolite content than the comparative catalyst. The yield of light oil is higher than that of the comparative catalyst by 5.5~6.8%. Particularly each activity index for hydrogen transfer activity index $\Sigma C_4^0/\Sigma C_4^=$ is higher than that of the comparative catalyst. All these indicate that the activity to decrease the olefin content of the catalyst disclosed in present invention is better than that of the conventional catalyst used to decrease the olefin content.

EXAMPLE 24

The catalysts RC-1, RC-9 and the comparative catalyst DM-4 disclosed in present invention were aged at 800° C. under a 100% steam atmosphere for 4 hours, 8 hours and 17 hours respectively, and then subjected to a nitrogen adsorption-desorption (BET) test. The specific surface areas measured are shown in FIG. 3.

Figure 3:
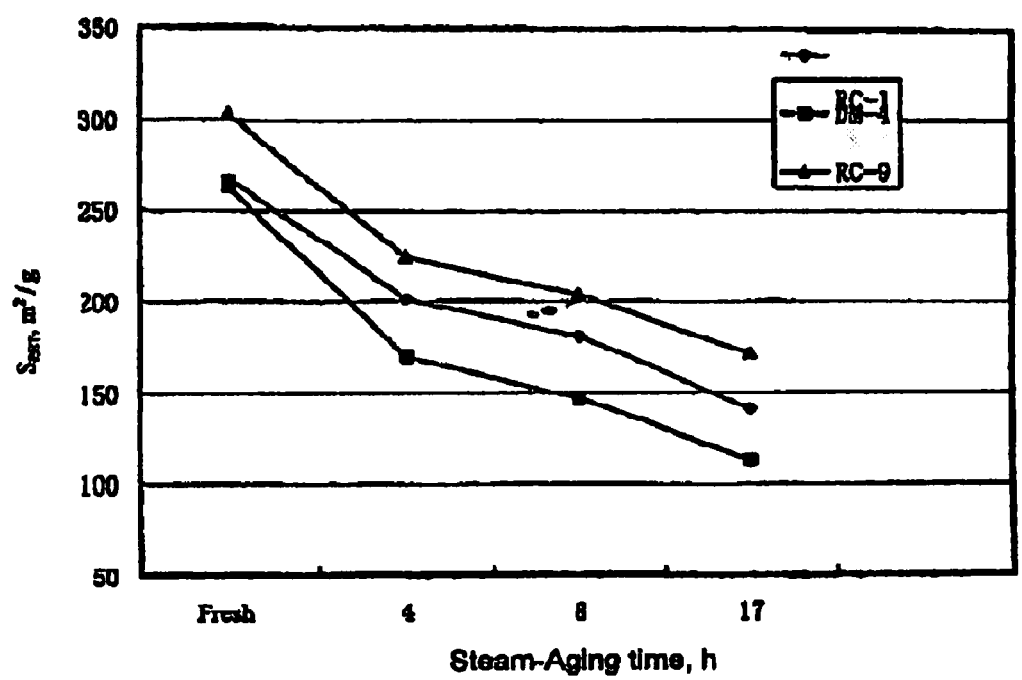
FIG. 3 is the BET graph of the catalyst after steam-aging treatment.

As seen from FIG. 3, the catalyst disclosed in present invention maintains high specific surface area after steam-aging treatment, indicating that the catalyst disclosed in present invention has high hydrothermal stability.

EXAMPLE 25

The catalysts RC-1, RC-2, RC-3, RC-4 and comparative catalysts DM-2, DM-5, DM-6 disclosed in present invention were aged at 800° C. for 17 hours under a 100% steam atmosphere respectively, and then measured for the equilibrium unit cell size of the zeolite in the catalyst by XRD. The measurement results are shown in Table 17.

TABLE 17

| Catalyst code | | Light oil micro activity, MAT | Equilibrium unit cell size, nm |
|---|---|---|---|
| Example | RC-1 | 62 | 2.437 |
| | RC-2 | 64 | 2.438 |
| | RC-3 | 65 | 2.444 |
| | RC-4 | 66 | 2.446 |
| | RC-5 | 63 | 2.448 |
| | RC-6 | 69 | 2.453 |
| | RC-7 | 66 | 2.449 |
| | RC-8 | 68 | 2.446 |
| | RC-9 | 64 | 2.445 |
| Comparative | DM-2 | 53 | 2.425 |
| example | DM-3 | 49 | 2.427 |
| | DM-4 | 50 | 2.425 |
| | DM-5 | 57 | 2.427 |
| | DM-6 | 59 | 2.430 |

As seen from Table 17, the unit cell size of each catalyst disclosed in present invention is larger than 2.435 nm, but the unit cell size of each comparative catalyst is smaller than 2.432 nm, indicating that the catalyst disclosed in present invention has high hydrothermal stability and structural stability.

The invention claimed is:

1. A rare-earth Y-zeolite-containing catalyst for cracking hydrocarbons, characterized in that the rare-earth content in the crystal lattice of the rare-earth Y-zeolite, calculated in $RE_2O_3$, is from 4 to 15% by weight, the original unit cell size is from 2.450 nm to 2.458 nm and the equilibrium unit cell size after 100% steam-aging treatment at 800° C. for 17 hours is larger than 2.435 nm.

2. A catalyst according to claim 1, characterized in that the rare-earth content in the crystal lattice of the rare-earth Y-zeolite, calculated in $RE_2O_3$, is from 6 to 12% by weight.

3. A catalyst according to claim 1, characterized in that the equilibrium unit cell size is larger than 2.440 nm.

4. A catalyst according to claim 3, characterized in that the equilibrium unit cell size is larger than 2.445 nm.

5. A catalyst according to claim 1, characterized in that the $Na_2O$ content of the rare-earth Y-zeolite is less than 1.0% by weight.

6. A catalyst according to claim 5, characterized in that the $Na_2O$ content of the rare earth Y-zeolite is less than 0.5% by weight.

7. A catalyst according to claim 1, characterized in that the Si/Al ratio of the rare-earth Y-zeolite is from 6 to 20.

8. A catalyst according to claim 7, characterized in that the Si/Al ratio of the rare-earth Y-zeolite is from 8 to 15.

9. A catalyst according to claim 1, characterized in that the differential thermal collapse temperature of the rare-earth Y-zeolite is higher than 1000° C.

10. A catalyst according to claim 9, characterized in that the differential thermal collapse temperature is from 1000 to 1056° C.

11. A catalyst according to claim 1, characterized in that the content of the rare-earth Y-zeolite is from 10 to 50% by weight.

12. A catalyst according to claim 11, characterized in that the content of the rare-earth Y-zeolite is from 15 to 40% by weight.

13. A catalyst according to claim 12, characterized in that the content of the rare-earth Y-zeolite is from 15 to 35% by weight.

14. A catalyst according to claim 1, characterized in that said catalyst contains zeolite with MFI structure, whose weight ratio to the rare-earth Y-zeolite is from 0.01 to 0.5.

15. A method for preparing the catalyst for cracking hydrocarbons according to claim 1, characterized in that the method has following steps:
(1) drying the rare-earth Y-zeolite till its water content less than 10% by weight, then in a weight ratio of $SiCl_4$:Y-zeolite of 0.1-0.9:1, the zeolite reacts with $SiCl_4$ gas carried by dry air at 150-600° C. for 10 min to 6 hours and is purged by dry air for 5 min to 2 hours after reaction, and then the residual soluble by-products in the zeolite are washed out by decationized water; and
(2) 10-50% by weight of the rare-earth Y-zeolite obtained in step (1), 10-60% by weight of a binder and 2-75% by weight of a clay are mixed and pulped, and formed by spray drying.

16. A method according to claim 15, characterized in that the rare-earth Y-zeolite disclosed in step (1) is selected from the industrial product of REHY and REY zeolite, or the product of the rare-earth ion exchanged NaY zeolite with or without drying.

17. A method according to claim 16, characterized in that the rare-earth content of the industrial REHY zeolite, calculated in $RE_2O_3$, is from 6 to 16% by weight and the $Na_2O$ content is more than 4% by weight.

18. A method according to claim 16, characterized in that the rare-earth content of the industrial REY zeolite, calculated in $RE_2O3$, is from 10 to 20% by weight and the $Na_2O$ content is more than 2% by weight.

19. A method according to claim 16, characterized in that the rare-earth ion exchange process of NaY zeolite is carried out by exchanging a NaY zeolite with an Si/Al ratio higher than 3.5 and an aqueous solution of rare-earth chloride in a weight ratio $NaY:RECl_3:H_2O$ of 1:0.1-0.25:5-10 at 80-90° C. for 30 to 60 min under a pH of more than 3.5.

20. A method according to claim 15, characterized in that the water content of the rareearth Y-zeolite disclosed in step (1) after drying is less than 5% by weight.

21. A method according to claim 15, characterized in that the reaction temperature disclosed in step (1) is from 200 to 500° C.

22. A method according to claim 15, characterized in that the content of the rare-earth Y-zeolite is from 15 to 40% by weight.

23. A method according to claim 15, characterized in that the content of the binder is from 15 to 40% by weight.

24. A method according to claim 15, characterized in the that content of the clay is from 20 to 60% by weight.

25. A method according to claim 15, characterized in that the binder is selected from one or more of pseudoboehmite, alumina sol, silica sol and phosphorusalumina sol.

26. A method according to claim 23, characterized in that the binder is a double-alumina binder of pseudoboehmite and alumina sol in a weight ratio of 10-40:0-30.

27. A method according to claim 26, characterized in that the weight ratio of pseudoboehmite and alumina sol is 15-25:2-25.

28. A method according to claim 26, characterized in that the weight ratio of acid and alumina in the acid treatment of pseudoboehmite is 0.1-0.6 when using a double-alumina binder.

29. A method according to claim 28, characterized in that weight ratio of acid and alumina is 0.15-0.35.

30. A method according to claim 15, characterized in that the clay is the clay usually used in cracking catalyst matrix.

31. A method according to claim 30, characterized in that the clay is selected from Kaolin, halloysite, montmorillonite, bernonite or sepiolite.

32. A method of processing residuum, comprising contacting the residuum with a catalyst according to claim 1.

33. A method according to claim 32, characterized in that the residuum is selected from full atmospheric residuum, distilled oil blended with atmospheric residuum or distilled oil blended with vacuumed residuum.

* * * * *